(12) United States Patent
Zucker et al.

(10) Patent No.: US 6,906,285 B2
(45) Date of Patent: Jun. 14, 2005

(54) REMOTE WIRE FEEDER

(75) Inventors: James P. Zucker, Northfield Center, OH (US); Keith L. Clark, Concord, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/692,086

(22) Filed: Oct. 24, 2003

(65) Prior Publication Data

US 2005/0087523 A1 Apr. 28, 2005

(51) Int. Cl.$^7$ ............................................. B23K 9/10
(52) U.S. Cl. .................... 219/132; 219/137.71
(58) Field of Search ............................ 219/132, 130.5, 219/137 PS, 137.71

(56) References Cited

U.S. PATENT DOCUMENTS 4,608,482 A * 8/1986 Cox et al. ................... 219/132
4,641,292 A * 2/1987 Tunnell et al. .............. 219/132
5,276,305 A * 1/1994 Hsien ......................... 219/132

FOREIGN PATENT DOCUMENTS

EP           0575082 A2 * 12/1993
JP           58-107272 A * 6/1983

* cited by examiner

Primary Examiner—Clifford C. Shaw
(74) Attorney, Agent, or Firm—Fay, Sharpe, Fagan, Minnich & McKee, LLP

(57) ABSTRACT

A wire feeder including a motor driving a set of feed rolls to force a welding wire from a spool through a welding torch to a welding operation. The wire feeder has an input lead to be connected to the output terminal of a remotely located power source having an on condition and an off condition where a welding current is directed to the output terminal only when the source is in the on condition. A weld starting trigger with a weld start position located adjacent the torch closes a switch when the trigger is shifted to the weld position, a circuit senses when the switch is closed, and a transmitter on the wire feeder transmits a start signal to the power source when the trigger switch is closed whereby the power source is shifted to its on condition when the trigger is in the weld position.

16 Claims, 1 Drawing Sheet

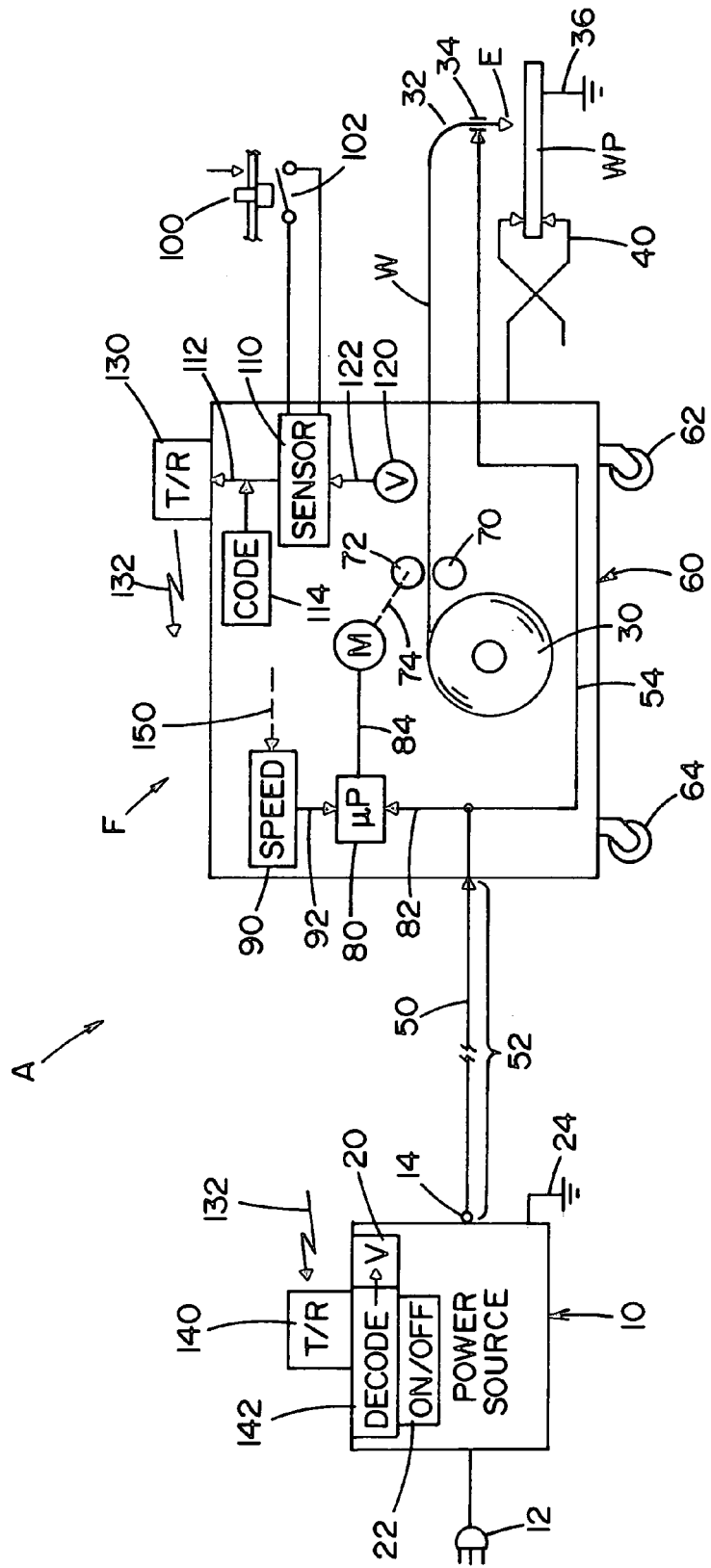

REMOTE WIRE FEEDER

The present invention relates to the art of electric arc welding and more particularly to a wire feeder with remote control for directing power to the feeder and to the arc.

BACKGROUND OF INVENTION

In many welding applications, a power source is in a fixed location and provides arc power through an electrode cable to a remotely located wire feeder having a spool of welding wire driven by a pair of feed rolls through an elongated tube out a welding torch to the welding operation. Current is directed through the electrode cable to the remotely located wire feeder that is movable from position to position for accommodating welding at different locations. The power on the electrode cable drives the motor that rotates feed rolls for pulling wire from the spool and forcing it through the gun or torch. A trigger on the gun or torch closes a switch to initiate the welding operation and start the drive motor for feeding wire. In accordance with this technology, the electrode cable is provided with power so operation of the trigger closes a mechanical contact within the wire feeder to direct welding current to the torch where it is connected to a contact around the advancing wire. Such remote wire feeders are sold by The Lincoln Electric Company as model No. LN-25 and LN-15. Each of these units has an internal contactor that is closed when the welding operation is to be started. The trigger also causes the motor to drive the feed rolls for advancing the welding wire from the storage spool. This type remote feeder is beneficial for certain welding, especially in shipyards. However, the internal mechanical contactor in the arc powered feeder is prone to failure caused by arc damage to the contacts due to repeated switching of high inductance DC current. Indeed, the mechanical contactor of the feeder is subject to damage from welding currents which often exceed the contactors current ratings. It has been found that in some installations, the mechanical contactors do not accommodate repeated use of extremely high welding currents. The wire feeder can not perform short, repetitive welds such as stitch welding or spot welding because of the accumulated heating of the contactor and the mechanical effect of repeated arcing of the contact in the mechanical contactor. Each time the trigger is pulled, a current surge is created from the electrode cable to the gun. These remote wire feeders have difficulty in changing voltage. The current is controlled by the wire feed speed, however the voltage is separately adjustable. This adjustment must be made at the power source which is often a long distance from the actual welding operation. These units have a single cable between the power source and the wire feeder since coaxial cables and other dual cable designs are extremely expensive. Such deficiencies of existing arc powered wire feeders are overcome by the present invention.

BRIEF DESCRIPTION OF PRESENT INVENTION

In accordance with the present invention, a welding power source is used with an arc powered wire feeder and overcomes the deficiencies of the prior art discussed above. In accordance with the invention, there is no internal mechanical contactor in the wire feeder. The trigger of the welder is closed. This condition is sensed by the wire feeder and transmitted, either electromagnetically (RF) or through the electrode cable back to the power source. The power source is normally off. Upon receiving a start signal from the remotely located trigger, the power source is energized to direct power through the electrical cable going directly to the welding gun or torch without the intermediate current flow through the contacts of a mechanical contactor at the wire feeder. By using this invention, the welding output is initiated by electronic power devices in the power source itself. These devices or switches are rated for high current, high duty cycles and high power cycling. They are well constructed for competitive switching of high current from the power source to the welding gun. By using the present invention, a voltage select knob or device on the wire feeder itself can be adjusted to set the arc voltage. The set voltage is digitized and transmitted as a signal back to the power source. In this manner, the voltage adjustment of the power source is accomplished by a signal transmitted from the wire feeder back to the power source. A single cable from the power source to the wire feeder is used to transmit welding power to the wire feeder when the weld process is started. To accomplish this objective, a signal is transmitted when the trigger closes the trigger switch to drive the feed rolls and start the weld process. Consequently, the feeder itself is used to adjust the voltage as well as the wire feed speed that controls the current of the welding process.

In accordance with the present invention there is provided a wire feeder including a motor driving a set of feed rolls to force a welding wire from a spool through a welding torch to a welding operation. The wire feeder has a single input lead to be connected to the output terminal of a remotely located power source having an on condition and an off condition. A welding current is directed to the output terminal only when the source is in the on condition. A weld starting trigger, with a weld start position, is located adjacent the torch to close a switch when the trigger is shifted to the weld position. A circuit senses when the switch is closed and a transmitter on the wire feeder transmits a starting signal to the power source when the trigger switch is closed. Thus, the power source is shifted to its on condition when the trigger is in the weld position. In accordance with an aspect of the invention, the transmitter is an RF signal generator to create an electromagnetic signal that is coded in a manner that activates the receiver on the power source. In accordance with another aspect of the invention, the transmitter creates a signal transmitted to the power source through the input leads to the output terminal of the power source. Again, the signal is coded for transmission on the electrical cable itself for receipt only by the associated power source. In accordance with another aspect of the present invention the wire feeder has a voltage select device for manually adjusting to a condition corresponding to the desired arc voltage. A signal representing the set voltage is transmitted as a signal to the power source for setting the voltage of the power source based on the desired voltage set at the remote wire feeder.

In accordance with still a further aspect of the invention, there is provided a method for turning on a power source of an electric arc welder including a remotely located wire feeder connected to the power source by a power cable. The method comprises starting the welding cycle of a welding process for the welder, sensing this starting, transmitting a signal from the wire feeder power source when the starting is sensed and starting the power source upon receipt of a signal to direct power to the wire feeder by the connecting cable.

The primary object of the present invention is the provision of a remotely located wire feeder driven by a power source, wherein the feeder itself does not include a mechanical contactor for starting and stopping the weld process.

Another object of the present invention is the provision of a feeder, as defined above, which feeder includes a voltage select device to create a signal representative of the set voltage. This signal is transmitted to the power source for directing the desired arc voltage from the power source to the wire feeder where it can be used for the welding process.

These and other objects and advantages will become apparent from the following description wherein: the single drawing is a schematic diagram of the preferred embodiment of the present invention.

PREFERRED EMBODIMENT

The single drawing shows an electric arc welder A of the type including a generally fixed power source and having input 12 and output terminal or output 14 wherein the arc voltage is controlled by a circuit when the power supply is on at switch 22. In accordance with normal practice, power source 10 has ground 24. The invention involves a remotely located wire feeder F of the type including an internal spool 30 for electric arc welding wire W. The wire is pulled from spool 30 and pushed through gun or torch 32 to a contact sleeve 34. Electric power is directed to electrode E, which is wire W, for performing an electric arc welding process between the electrode and workpiece WP. Standard ground 36 is connected to the wire feeder through ground clamp 40. Input cable 50 has a length 52 and connects terminal 14 to power lead 54 within feeder F so power is directed to contact sleeve 34 for the welding process when switch 22 of the power supply is closed. In the prior art, a mechanical contact is used in feeder F to direct power from power source 10 to contact sleeve 34. The power supply is on and the welding operation is determined by the closing of the contact in the wire feeder when trigger 100 is closed. In the present invention, power supply 10 is off until the welding process is to be performed. Remote wire feeder F has cabinet 60 with lower casters 62, 64 so that the wire feeder is easily movable into various locations allowed by the length 52 of cable 50. A welding operation at various locations can be performed effectively. This type of welder is used where the welding operation is not fixed and varies, such as in a shipyard. In some instances, cabinet 60 does not include wheels or casters 62, 64, but is merely pulled along by an appropriate handle from one location to another. In accordance with standard technology, feeder F includes a feed roll 70, 72 driven by motor M through shaft 74. Speed is controlled by microprocessor or other controller 80 that receives power from cable 50 through input 82. Output 84 has a voltage to determine the desired speed of motor M for the proper wire feed speed (WFS) of wire W. The speed is used to control arc current. The feed speed is determined by the speed of motor M and is adjusted manually by speed control 90 having an output 92 for controlling the operation of microprocessor controller 80. Movable trigger 100, associated with gun or torch 32, is depressed to close start switch 102 for starting the welding process between electrode E and workpiece WP. The start condition of switch 102 is sensed by circuit 110 having an output 112 which is digital and coded by an appropriate device 114. Consequently, switch 102 is closed to start a welding process. Sensor 110 creates a coded signal on line 112 indicating that trigger 100 has been closed. In accordance with an aspect of the invention, a voltage knob 120 is set to the desired arc voltage between electrode E and workpiece WP. The position of knob 120 determines the signal on output 122 which is also directed to sensor 110. The output of the voltage control or set knob 120 gives a signal in line 112 which is also modulated by device 114.

Thus, a signal in line 112 from sensor 110 indicates when the weld cycle is started by trigger 100 and the desired arc voltage set by knob 120. This coded information is directed to the transceiver 130 that transmits a signal 132, which is an RF electromagnetic signal indicating that the welding process has commenced. In the embodiment using voltage knob 120, the desired voltage for the welding operation is also transmitted to power source 10. These signals are communicated through the air with receiver 140 on power source 10. The output of the receiver is passed through a decoder 132 for transmitting a set point signal to voltage control 20 and the start signal to switch 22. By merely depressing trigger 100 the welding cycle is started by power source 10. A set voltage is applied to line 54. When trigger 100 is released, switch 102 is opened and a signal on line 112 is transmitted by transceiver 130 to turn off power source 10. In this manner, wire feeder F has no mechanical contactor as used in the prior art when a single cable connects a power source with a wire feeder movable into various remote locations. Thus, the disadvantage of a mechanical contactor in such wire feeder is eliminated.

In accordance with an aspect of the invention, transceiver 130 is used to provide a coded signal to receiver 140 by cable 50 and not through the air as indicated by signal 132. In still a further aspect of the present invention, receiver 140 is a transceiver and transmits a RF signal to transceiver 130 for the purposes of remotely adjusting the wire feed speed circuit 90, as indicated by the dashed line 150. Other arrangements could be provided for communicating between the remote wire feeder F and power supply 10 to provide the parameters either to or from remotely located wire feeder F.

Having thus defined the invention, the following is claimed:

1. A wire feeder including a motor driving a set of feed rolls to force a welding wire from a spool through a welding torch to a welding operation, said wire feeder having an input lead to be connected to the output terminal of a remotely located power source having an on condition and an off condition where a welding current is directed to said output terminal only when said source is in said on condition, a weld starting trigger with a weld start position located adjacent said torch to close a switch when said trigger is shifted to the weld start position, a circuit coupled to said switch to sense when said switch is closed, and a transmitter on said wire feeder, said transmitter being coupled to said circuit and being operable to transmit a starting signal to said power source when said switch is closed whereby said power source is shifted to its on condition when said trigger is in said weld start position.

2. A wire feeder as defined in claim 1 wherein said transmitter is an RF signal generator.

3. A wire feeder as defined in claim 2 wherein said wire feeder has a voltage select device for manual adjustment to a condition corresponding to a desired arc voltage.

4. A wire feeder as defined in claim 3 including a circuit to convert said condition to a voltage level signal and a transmitter on said wire feeder to transmit said voltage level signal to said power source whereby said power source is set to said desired voltage.

5. A wire feeder as defined in claim 2 including a speed control device for controlling arc current.

6. A wire feeder as defined in claim 1 wherein said transmitter creates a signal transmitted to said power source through said input lead to said output terminal of said power source.

7. A wire feeder as defined in claim 6 wherein said wire feeder has a voltage select device for manual adjustment to a condition corresponding to a desired arc voltage.

8. A wire feeder as defined in claim 7 including a circuit to convert said condition to a voltage level signal and a transmitter on said wire feeder to transmit said voltage level signal to said power source whereby said power source is set to said desired voltage.

9. A wire feeder as defined in claim 6 including a speed control device for controlling arc current.

10. A wire feeder as defined in claim 1 wherein said wire feeder has a voltage select device for manual adjustment to a condition corresponding to a desired arc voltage.

11. A wire feeder as defined in claim 10 including a circuit to convert said condition to a voltage level signal and a transmitter on said wire feeder to transmit said voltage level signal to said power source whereby said power source is set to said desired voltage.

12. A wire feeder as defined in claim 10 including a speed control device for controlling arc current.

13. A wire feeder as defined in claim 1 including a speed control device for controlling arc current.

14. A method for turning on a power source of an electric arc welder including a remotely located wire feeder connected to said power source by a power cable, said method comprising:

(a) starting the welding cycle of a welding process for said welder by shifting a weld starting trigger of the wire feeder to a weld start position to close a switch;

(b) sensing said starting by sensing when said switch is closed using a sensor circuit in the wire feeder;

(c) transmitting a signal from said wire feeder to said power source when said starting is sensed; and, (d) starting said power source upon receipt of said signal to direct power to said wire feeder by said cable.

15. A method as defined in claim 14 wherein said transmitted signal is RF.

16. A method as defined in claim 14 wherein said transmitted signal is by way of said cable.

* * * * *